(12) United States Patent
Konigsburg et al.

(10) Patent No.: US 8,943,301 B2
(45) Date of Patent: *Jan. 27, 2015

(54) STORING BRANCH INFORMATION IN AN ADDRESS TABLE OF A PROCESSOR

(75) Inventors: Brian R. Konigsburg, Austin, TX (US); David Stephen Levitan, Austin, TX (US); Wolfram M. Sauer, Nufringen (DE); Samuel Jonathan Thomas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/101,650

(22) Filed: May 5, 2011

(65) Prior Publication Data

US 2011/0213951 A1  Sep. 1, 2011

Related U.S. Application Data

(63) Continuation of application No. 12/171,370, filed on Jul. 11, 2008, now Pat. No. 7,984,280, which is a continuation of application No. 11/049,014, filed on Feb. 2, 2005, now Pat. No. 7,426,631.

(51) Int. Cl.
| | | |
|---|---|---|
| *G06F 15/00* | (2006.01) | |
| *G06F 7/38* | (2006.01) | |
| *G06F 9/00* | (2006.01) | |
| *G06F 9/44* | (2006.01) | |
| *G06F 9/38* | (2006.01) | |

(52) U.S. Cl.
CPC .................................. *G06F 9/3806* (2013.01)
USPC ........................................ 712/239; 712/240

(58) Field of Classification Search
None
See application file for complete search history.

(56) References Cited

U.S. PATENT DOCUMENTS

| | | |
|---|---|---|
| 5,222,224 A | 6/1993 | Flynn et al. |
| 5,414,822 A | 5/1995 | Saito et al. |
| 5,471,597 A | 11/1995 | Byers et al. |
| 5,509,137 A | 4/1996 | Itomitsu et al. |
| 5,530,825 A | 6/1996 | Black et al. |
| 5,574,871 A | 11/1996 | Hoyt et al. |
| 5,577,217 A | 11/1996 | Hoyt et al. |
| 5,584,001 A | 12/1996 | Hoyt et al. |
| 5,737,590 A | 4/1998 | Hara |

(Continued)

OTHER PUBLICATIONS

U.S. Appl. No. 11/049,014.

(Continued)

*Primary Examiner* — George Giroux
(74) *Attorney, Agent, or Firm* — Stephen J. Walder, Jr.; Thomas E. Tyson

(57) ABSTRACT

Methods for storing branch information in an address table of a processor are disclosed. A processor of the disclosed embodiments may generally include an instruction fetch unit connected to an instruction cache, a branch execution unit, and an address table being connected to the instruction fetch unit and the branch execution unit. The address table may generally be adapted to store a plurality of entries with each entry of the address table being adapted to store a base address and a base instruction tag. In a further embodiment, the branch execution unit may be adapted to determine the address of a branch instruction having an instruction tag based on the base address and the base instruction tag of an entry of the address table associated with the instruction tag. In some embodiments, the address table may further be adapted to store branch information.

19 Claims, 5 Drawing Sheets

(56) References Cited

U.S. PATENT DOCUMENTS

| | | |
|---|---|---|
| 5,740,415 A | 4/1998 | Hara |
| 5,822,577 A | 10/1998 | Ekanadham et al. |
| 5,835,754 A | 11/1998 | Nakanishi |
| 5,842,008 A | 11/1998 | Gochman et al. |
| 5,860,017 A | 1/1999 | Sharangpani et al. |
| 5,953,512 A | 9/1999 | Cai et al. |
| 6,021,489 A | 2/2000 | Poplingher |
| 6,108,773 A | 8/2000 | Col et al. |
| 6,247,124 B1 * | 6/2001 | Joshi et al. ............ 712/240 |
| 6,484,256 B1 | 11/2002 | Levitan et al. |
| 6,489,441 B1 * | 12/2002 | Evans et al. ............ 530/350 |
| 7,069,426 B1 | 6/2006 | Hummel |
| 7,426,631 B2 | 9/2008 | Konigsburg et al. |
| 2005/0268075 A1 * | 12/2005 | Caprioli et al. ........ 712/239 |
| 2008/0276080 A1 | 11/2008 | Konigsburg et al. |

OTHER PUBLICATIONS

U.S. Appl. No. 12/171,370.

* cited by examiner

| BASE INSTRUCTION TAG 502 | BASE ADDRESS 504 |
|---|---|
| ... | ... |
| 2 | 0x0000_0000_0000_002C |
| 5 | 0x0000_0000_0000_0240 |
| ... | ... |

| BASE INSTRUCTION TAG 602 | BRANCH IN ENTRY 604 | TAG OF LAST BRANCH 606 | LAST BRANCH TAKEN 608 |
|---|---|---|---|
| 0x2 | Yes | 0x4 | Yes |
| 0x5 | Yes | 0x10 | No |
| 0x13 | No | -- | -- |
| 0x1C | Yes | 0x1E | No |
| ... | ... | ... | ... |

STORING BRANCH INFORMATION IN AN ADDRESS TABLE OF A PROCESSOR

CROSS-REFERENCES TO RELATED APPLICATION(S)

Pursuant to 35 USC §120, this continuation application claims priority to and benefit of U.S. patent application Ser. No. 12/171,370, filed Jul. 11, 2008, status allowed, which is a continuation of U.S. patent application Ser. No. 11/049,014, entitled "METHODS AND SYSTEMS FOR STORING BRANCH INFORMATION IN AN ADDRESS TABLE OF A PROCESSOR", filed on Feb. 2, 2005, the disclosures of which are incorporated herein in their entirety for all purposes.

BACKGROUND OF THE INVENTION

The present invention is in the field of processors for computer systems. More particularly, the present invention relates to methods storing branch information in an address table of a processor.

Processors or microprocessors used in processor chips, which are also known as microchips or integrated circuits (ICs), are an integral part of computer systems, performing tasks such as executing and storing instructions. Constantly increasing performance requirements combined with competitive pressures to minimize costs result in significant challenges in processor design. Processor designers attempt, for instance, to extract more and more processing speed from their processor designs. Design changes initiated to increase speed, however, often result in increased area of silicon used by the processor design, resulting in increased costs. Processor design requires such trade-offs between performance and silicon area (and costs).

To improve performance, many processors increase the speed of processing by decoding one or more instructions while the preceding instruction is executing in a process known as pipelining. Many processors also utilize branch processing in their design. Branch processing occurs when a branch instruction implements a jump to another location of instructions, resulting in a break in the flow of instructions performed by the processor. The break in the flow of instructions caused by conditional branch processing results in difficulties in implementing pipelining, as the processor does not know which instruction to next feed into the pipeline. To solve this problem, processor designers use branch prediction where the processor attempts to predict whether the branch instruction will jump or not. The processor will then use the branch prediction to decide which instruction to load next into the pipeline in a process known as speculative execution. If the branch prediction is incorrect, the pipeline is flushed and calculations discarded, but if the branch prediction is correct, the processor has saved a significant amount of time. Static branch prediction utilizes known characteristics of the instruction to provide predictions of which branches are most likely to be taken. Processor designers also may use dynamic branch prediction to further improve performance. Dynamic branch prediction allows the hardware to change its branch predictions as the program executes. The improved performance of dynamic branch prediction becomes particularly useful for processors that attempt to issue more than one instruction per clock cycle.

In order to properly execute branch instructions, information such as the instruction address and predicted target address need be known and stored. One approach to the problem of storing the instruction address and predicted target address is to store the predicted target address along with the instruction text in the instruction buffer (also known as an I-buffer). As processors increase the size of their addressable memory, storing address information in this fashion becomes increasingly wasteful. In a 64-bit machine, for example, each predicted target address will require a full 64-bit register of storage, resulting in an undesirable use of space and silicon. As processors become increasingly sophisticated, the space requirement for the branch prediction information will become even more of an issue.

Dynamic branch prediction requires additional information to be stored, such as an indication of whether a branch was originally predicted to be taken or not taken, exacerbating the problems with using an instruction buffer. To implement dynamic branch prediction, a branch taken indication may be passed along with an instruction, regardless of whether the instruction is a branch instruction or not, potentially resulting in an even larger waste of silicon. Moreover, there is a significant latency associated with fetching instructions, dynamically predicting if branches in the fetch group were taken, and sending this information to the instruction buffer to be dispatched to the branch execution engine. This could result in the branch taken indication not being available to the branch execution mechanism in time for it to be useful.

Another approach to storing address information relating to branch operations is to store the information in a separate branch information queue. A separate branch information queue cuts down on the space requirements of the instruction buffer solution, but it still requires a significant amount of area as well as additional complexity. For processors using dynamic branch prediction and the associated additional storage requirements, the problems associated with using a separate branch information queue are worsened.

There is, therefore, a need for an effective mechanism for storing branch information in a processor that reduces the silicon area used for storage and improves latency. There is an even greater need for such a mechanism as chips become more and more powerful and branch prediction methods such as dynamic branch prediction are used by processor designers.

BRIEF SUMMARY OF THE INVENTION

The problems identified above are in large part addressed by methods and systems for storing branch information in an address table of a processor. One embodiment generally provides a method for storing branch address information in an address table of a computer processor. The method may generally include creating in the address table a first entry, the first entry having a base instruction tag for a first instruction and a base address associated with the first instruction. The method may also generally include, in response to a branch in an entry being predicted taken, creating a new second entry having a second base instruction tag for a second instruction and a second base address associated with the second instruction where an address associated with the instruction tag may be determined based on the base instruction tag and the base address for an entry associated with the instruction tag. The method may further include storing in the address table for each entry one or more of an indication of whether there is a branch present in the entry, an instruction tag of the last branch that is in the entry, and an indication of whether the last branch in the entry is predicted taken. A further embodiment may include provide that the address associated with an instruction tag may be determined by extracting the base instruction tag and the base address for the entry associated with the instruction tag from the address table and calculating the instruction address associated with the instruction tag based on the instruction tag, the base instruction tag, and the base address.

Another embodiment generally provides a method for accessing branch information in an address table of a computer processor. The method may generally include determining an entry of the address table associated with a branch instruction having an instruction tag and determining from the entry whether the branch is present in the entry, whether the last branch of the entry was predicted taken, and whether the instruction tag matches the last instruction tag of the entry. The method also may generally include, in the event that a branch is present in the entry, the last branch of the entry is predicted taken, and the instruction tag matches the last instruction tag of the entry, determining that the branch instruction was predicted to be taken. The method may further include calculating an address associated with a branch instruction based on a base instruction tag and a base address for the entry in the address table associated with the instruction tag. The method may further include determining the predicted target address for the branch instruction by extracting the base address for the entry subsequent to the entry associated with the branch instruction A further embodiment provides a data processor for processing instructions that includes in one embodiment. The processor may generally include an instruction fetch unit connected to an instruction cache, a branch execution unit, and an address table being connected to the instruction fetch unit and the branch execution unit. The address table may generally be adapted to store a plurality of entries with each entry of the address table being adapted to store a base address and a base instruction tag. In a further embodiment, the branch execution unit may be adapted to determine the address of a branch instruction having an instruction tag based on the base address and the base instruction tag of an entry of the address table associated with the instruction tag. In a further embodiment, the address table may further be adapted to store branch information.

DETAILED DESCRIPTION OF THE INVENTION

Figure 1:
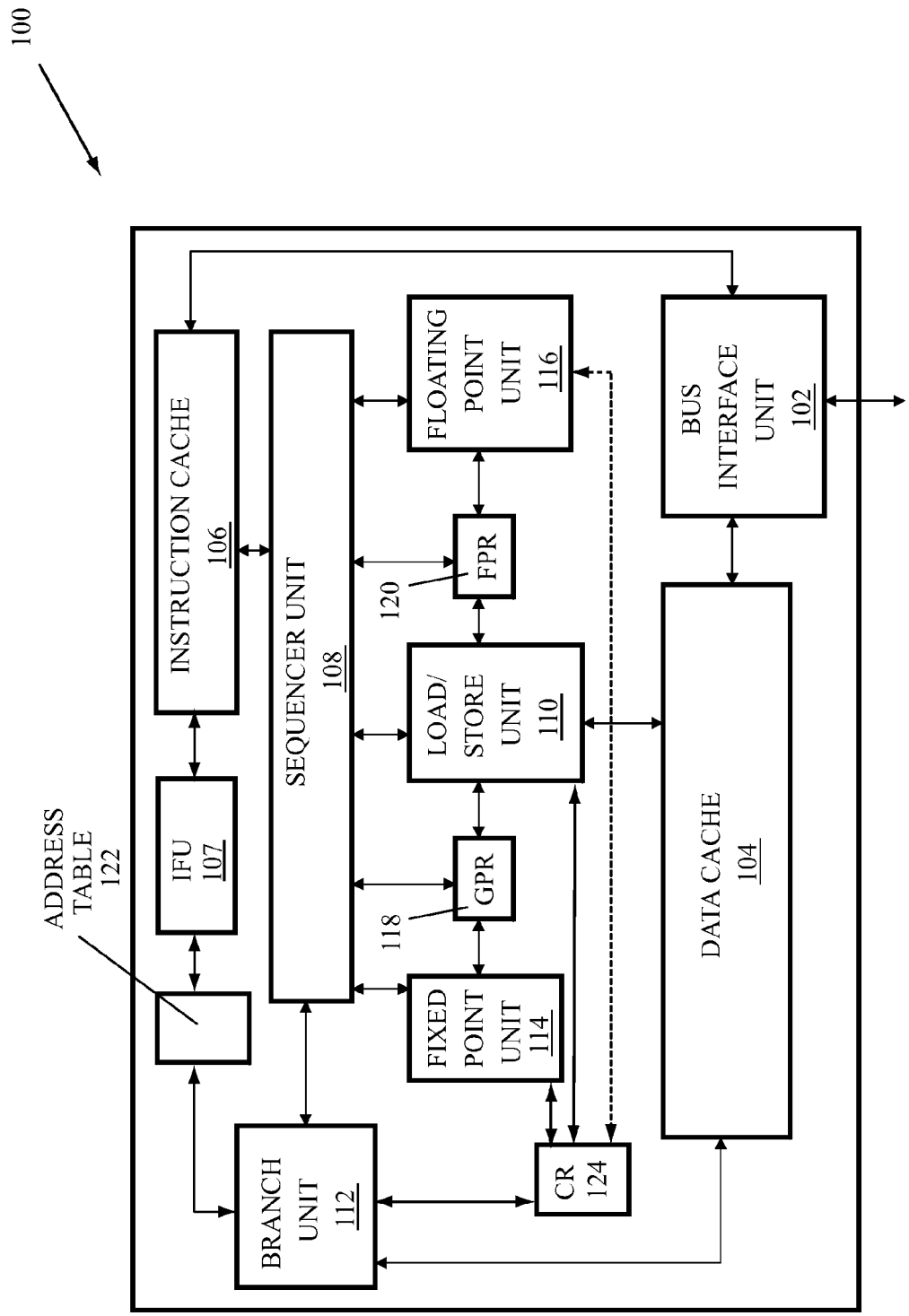
FIG. 1 depicts a block diagram of a data processor according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Methods and systems for storing branch information in an address table of a processor are disclosed. A processor of the disclosed embodiments may generally include a branch execution unit, an instruction fetch unit connected to an instruction cache, and an address table being connected to the instruction fetch unit and the branch execution unit. The address table may generally be adapted to store a plurality of entries with each entry of the address table being adapted to store a base address and a base instruction tag. In a further embodiment, the branch execution unit may be adapted to determine the address of a branch instruction having an instruction tag based on the base address and the base instruction tag of an entry of the address table associated with the instruction tag. In some embodiments, the address table may further be adapted to store branch information for each entry.

The methods and systems of the disclosed embodiments provide an improved mechanism for storing and accessing branch information in an address table of a processor. By using entries in an address table that may represent multiple instructions, the address table may be made advantageously smaller than previous designs as each instruction address need not be stored in the address table. The address table of the disclosed embodiments may also provide a predicted target address for branch processing systems. The branch execution unit may be connected to the address table. Because a new entry may be created whenever a branch is predicted to be taken, the first address (the base address) of the next entry may provide an indication of the predicted target address of the last branch in the previous entry. The branch execution unit may then extract the predicted target address from the address table, eliminating the need to store such information in an instruction cache or separate branch information queue, saving valuable processor space.

The benefits of the methods and systems of the disclosed embodiments may be amplified when the data processor utilizes dynamic branch prediction with the branch processing routines. Dynamic branch prediction requires additional branch information, such as whether a branch that was taken was actually predicted to be taken. Branch information may also be stored in entries of the address table so that the branch execution unit may determine whether a branch was predicted to be taken. In previous systems, such information typically needed to be passed along with each instruction (whether or not the instruction was a branch instruction), resulting in wasted silicon, or needed to be stored in a separate branch information queue. Moreover, by allowing the branch execution unit to access the address table the latency problem found in previous systems is ameliorated as the branch taken indication can be available immediately instead of waiting for the information from the instruction buffer.

Turning now to the drawings, FIG. 1 depicts a block diagram of a data processor according to one embodiment. Data processor 100 may be any computer processor, such as one implementing International Business Machine's (IBM's) PowerPC® Architecture™ instruction set. Data processor 100 may, among other tasks, store and execute a variety of instructions. Data processor 100 may, in one embodiment, be a reduced instruction set computer (RISC) that overlaps instruction processing to increase performance. A RISC data processor may achieve high performance by breaking each instruction into a sequence of smaller steps, each of which may be overlapped in time with steps of other instructions, in a process known as pipelining. Processors are known in the art and attention will be focused herein on those aspects of data processor 100 relevant to the differences between data processor 100 and prior art processors, while other details will be omitted in the interest of brevity.

In the depicted embodiment, data processor 100 includes a bus interface unit 102 to control the flow of data between data processor 100 and the remainder of a data processing system (not shown). Bus interface unit 102 may be connected to a data cache 104 and an instruction cache 106. Instruction cache 106 may supply an instruction stream to a sequencer unit 108, which forwards individual instructions to the appropriate execution units. An instruction fetch unit 107 may read information from or write information to the instruction cache 106. Execution units may include a load/store unit 110, a branch execution unit 112, one or more fixed point execution units 114, and one or more floating point execution units 116. The fixed point execution units 114 and the load/store unit 110 may read and write their results to a general purpose architectural register file (GPR) 118. The floating point units 116 and the load/store unit 110 may read and write their results to a floating point architectural file (FPR) 120. Data processor 100 may also include a condition register 124, which may store comparison information (such as condition codes) relating to comparisons between different registers. For example, the results of a comparison between two GPR 118 entries may be stored in the condition register 124. The condition register 124 may optionally be connected to the load/store unit 110 so that the load/store unit 110 may also update the condition register 124.

Generally, a branch execution unit 112 may determine what sequence of programmed instructions is appropriate given the contents of certain data registers and the instructions themselves. In one embodiment, branch execution unit 112 may employ one or more dynamic prediction mechanisms to improve performance by predicting the direction of branch instructions early in the pipeline. Instruction fetch unit 107 may provide the sequence of programmed instructions from the branch execution unit 112 to the sequencer unit 108. Instruction fetch unit 107 may fetch instructions from a main memory system external to data processor 100 via bus interface unit 102 if the instructions are not contained within instruction cache 106. The sequencer unit 108 may then dispatch the individual instructions to the various execution units 110, 112, 114, and 116. Each execution unit may perform one or more instructions of a particular class of instructions as indicated by the name of the execution unit. For instance, fixed point execution units 114 may perform mathematical operations on operands expressed in fixed point notation while floating point execution units 116 may perform mathematical operations on operands expressed in floating point notation.

As branch instructions from the branch execution unit 112 progress through the pipeline they will become fully executed (such as by the execution units). The branch execution unit 112 may then determine whether the predicted target address and/or the predicted direction of the branch matches the actual outcome of the branch. In the event that the prediction was incorrect, the branch execution unit 112 may flush undesired instructions and results, redirect the pipeline appropriately, and update the branch prediction information.

To perform its tasks, the branch execution unit 112 may access an address table 122 in order to access branch information. The address table 122, which is described in more detail in relation to FIGS. 5 and 6, may contain addresses for every instruction of the data processor 100 in one embodiment. The instruction fetch unit 107 may also access the address table 122 to acquire instruction addresses for external interrupts, exception handling or the like. The address table 122 may also contain branch information for use by the branch execution unit 112. In one embodiment, the instruction addresses may also be stored in the address table 122 in a series of entries, as described in more detail in relation to FIG. 2. In this embodiment, if an instruction tag is known for an instruction, the branch execution unit 112 may access the appropriate entry of the address table 122 and determine the instruction address based on the base address and base instruction tag in that entry. Similarly, the predicted branch target address may be determined by accessing the base address stored in the next entry. This allows a branch execution unit 112 to access the information necessary for branch processing from the address table 122 without having to access a separate branch information queue or an instruction buffer.

In an alternative embodiment, once all of the instructions in a given entry have completed, the entry of the address table 122 may be invalidated. When an entry is invalidated, the space associated with that entry may be used again, providing additional reductions in the area needed for address table 122, as only entries with instructions currently in the pipeline need be stored.

In a further embodiment, additional branch information may also be stored in the address table 122, such as an indication of whether at least one branch is present in the entry, the instruction tag of the last branch that is in the entry, and an indication of whether the last branch in the entry was predicted taken. Branch execution unit 112 may use this branch information for dynamic branch prediction or any other purpose.

Previous branch execution units 112 accessed branch information via a separate branch information queue or from an instruction cache 106. Using a separate branch information queue required use of silicon of the data processor 100 for the branch information queue, adding expense and using valuable space. Storing branch information with instructions in the instruction buffer of the instruction cache 106 requires each entry in the instruction buffer to include space for branch information, increasing the required size of the instruction cache 106. As more advanced data processors 100 continue to be developed (64 bit processors, for example), the wasted space in the instruction cache 106 becomes even more pronounced, as the branch address, for example, will require 64 additional bits for each instruction in a 64 bit processor. In contrast, the information storage system of the disclosed embodiments takes advantage of the storage already required as part of the address table 122 by connecting the branch execution unit 112 to the address table 122.

The methods of the disclosed embodiments may also provide an improved address table 122 when compared to previous methods. In the disclosed embodiment, the address of each instruction need not be stored. Instead, a base instruction tag and a base address allow a base address to be stored for each entry, where each entry may have a plurality of associated instructions. The disclosed address table 122 only requires the address to be stored for the first instruction of each entry, reducing the required size of the address table 122 and saving valuable space and silicon on the data processor 100.

Figure 2:
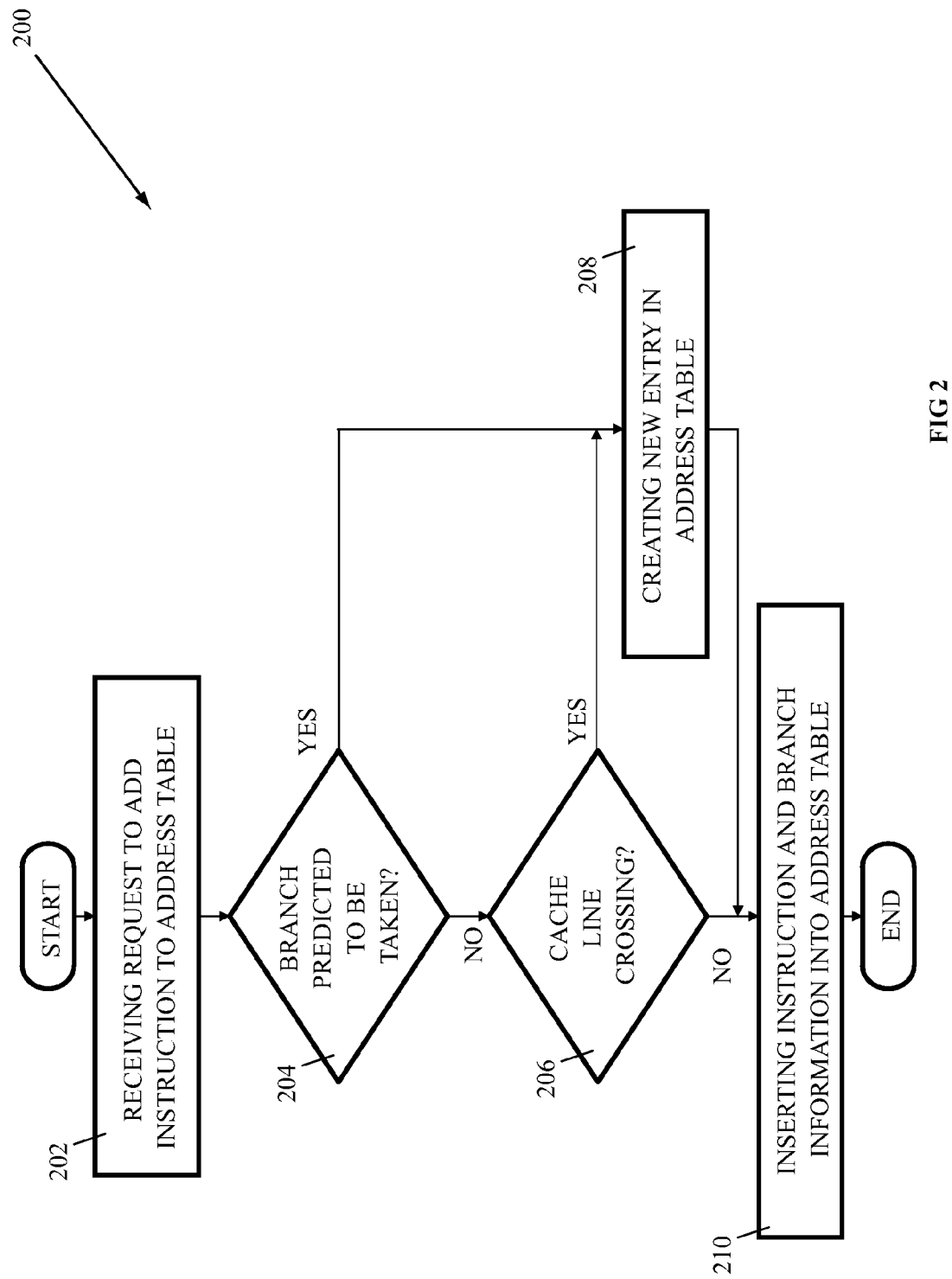
FIG. 2 depicts an example of a flow chart for storing address information in an address table of a processor according to one embodiment.

FIG. 2 depicts an example of a flow chart for storing address information in an address table 122 of a processor according to one embodiment. The elements of flow chart 200 may be performed, in one embodiment, by a branch execution unit 112 of a data processor 100, or they may be performed by another component or combination of components. Flow chart 200 begins with element 202, receiving a request to add an instruction to an address table 122. The request may be received at any time, such as before, during, or after any execution of branch instructions. The request to add an instruction may typically include an address for the instruction and optionally include an instruction tag for the instruction. After element 202, the method of flow chart 200 continues to decision block 204, where it is determined whether a branch in the current entry of the address table 122 is predicted to be taken. If a branch in the current entry is predicted to be taken, flow chart 200 continues to element 208 and a new element is created in the address table 122. Flow chart 200 may assign an instruction tag to the instruction at element 208 or it may receive an instruction tag at element 202. The address of the new instruction may serve as the source of the base address in the address table 122 for the new entry. By creating a new entry whenever a branch in the current entry is predicted taken, the predicted target address of a branch instruction may thus be found by determining the base instruction address of the next entry.

If no branch in the current entry is predicted to be taken, flow chart 200 continues to optional decision block 206, determining whether a cache line crossing relating to a new fetch group has occurred with the new instruction received at element 202. If there has been a cache line crossing relating to a new fetch group, flow chart 200 continues to element 208, creating a new entry in the address table 122. In this optional embodiment, a new entry is required whenever there is a cache line crossing relating to a new fetch group so that instructions in one address table 122 entry only pertain to one fetch group. After creating a new entry (or if optional decision block 206 is not used), flow chart 200 continues to element 210, inserting the instruction and any branch information into the address table 122.

Whether a new entry is created at element 208 or not (based on an affirmative response in either decision block 204 or 206), the instruction and any branch information may be inserted into the address table 122 at element 210, after which the flow chart terminates. If no new entry is created, the address of the instruction need not be inserted into the address table 122 as its address may be determined using the method described in relation to FIG. 3. If a new entry is created, the address of the instruction may be inserted as the base address for the next entry at element 210. For either situation, more detailed branch information may be inserted as described in relation to FIGS. 4 and 6.

Figure 3:
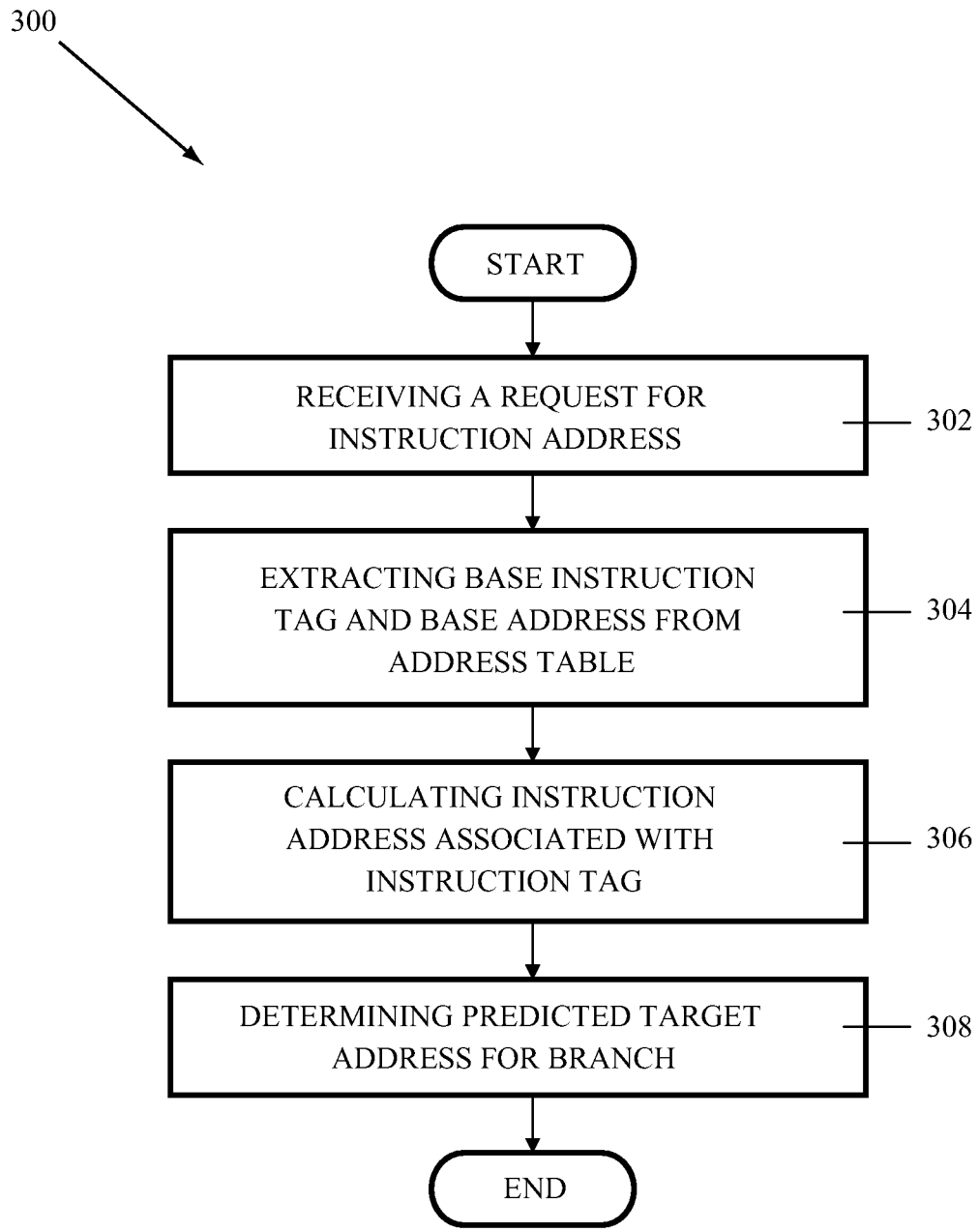
FIG. 3 depicts an example of a flow chart for extracting information from an address table of a processor and determining a predicted target address for a branch instruction according to one embodiment.

FIG. 3 depicts an example of a flow chart for extracting information from an address table of a processor and determining a predicted target address for a branch instruction according to one embodiment. The elements of flow chart 300 may be performed, in one embodiment, by a branch execution unit 112 of a data processor 100. Alternatively, the elements may be performed by another component or combination of components, such as an instruction fetch unit 107. Flow chart 300 begins with element 302, receiving a request for an instruction address from an address table 122. The request may be received at any time, such as before, during, or after any execution of branch instructions, and from any source, such as an element of the branch execution unit 112 or a bus interface unit 102. The request for an instruction address may include an indication of the address table 122 entry associated with the address and/or an instruction tag for the instruction for which the address is sought. Alternatively, the entry and/or instruction tag may be determined at element 302 based upon the request.

Once a request for an instruction address is received, flow chart 300 continues to element 304, extracting the base instruction tag and base address from the address table 122. In one embodiment, the base instruction tag and the base address should be the ones from the entry to which the unknown instruction address relates. Next, at element 306, flow chart 300 may calculate the instruction address associated with the instruction tag. In one embodiment, the instruction address may be calculated using the following equation:

$$\text{<instruction address>} = \text{<table base address>} + (\text{<instruction tag>} - \text{<base instruction tag>}) * IL$$

where IL represents a fixed instruction length. In one example, if an instruction has an instruction tag of '7', the base address is '0x000_0000_0000_0040', the base instruction tag of the entry is '2', and the fixed instruction length is '4' (representing a 4 byte instruction address), the instruction address may be calculated as follows:

$$\text{<instruction address>} = \text{<0x000\_0000\_0000\_0040>} + (7-2)*4 = 0x000\_0000\_0000\_0054.$$

The space savings resulting from the disclosed embodiments may clearly be seen as the addresses for the instructions with instruction tags of 3, 4, 5, 6, and 7 need not be stored in the address table and only the base address must be stored. Using the methodology of elements 304 and 306, the instruction address for an instruction not stored in the address table 112 may straightforwardly be determined.

After calculating the instruction address at element 306, flow chart 300 may continue to optional element 308 to determine the predicted target address of a branch in the entry. At element 308, the predicted target address may be equated to the base address of the next entry. As a new entry is created when a branch is predicted taken (as described in relation to FIG. 2), the base address of the next entry will be the address of the predicted target of the branch in the current entry. Optional element 308 may be particularly useful for a branch execution unit 112 seeking branch predicted information for its processing.

Figure 4:
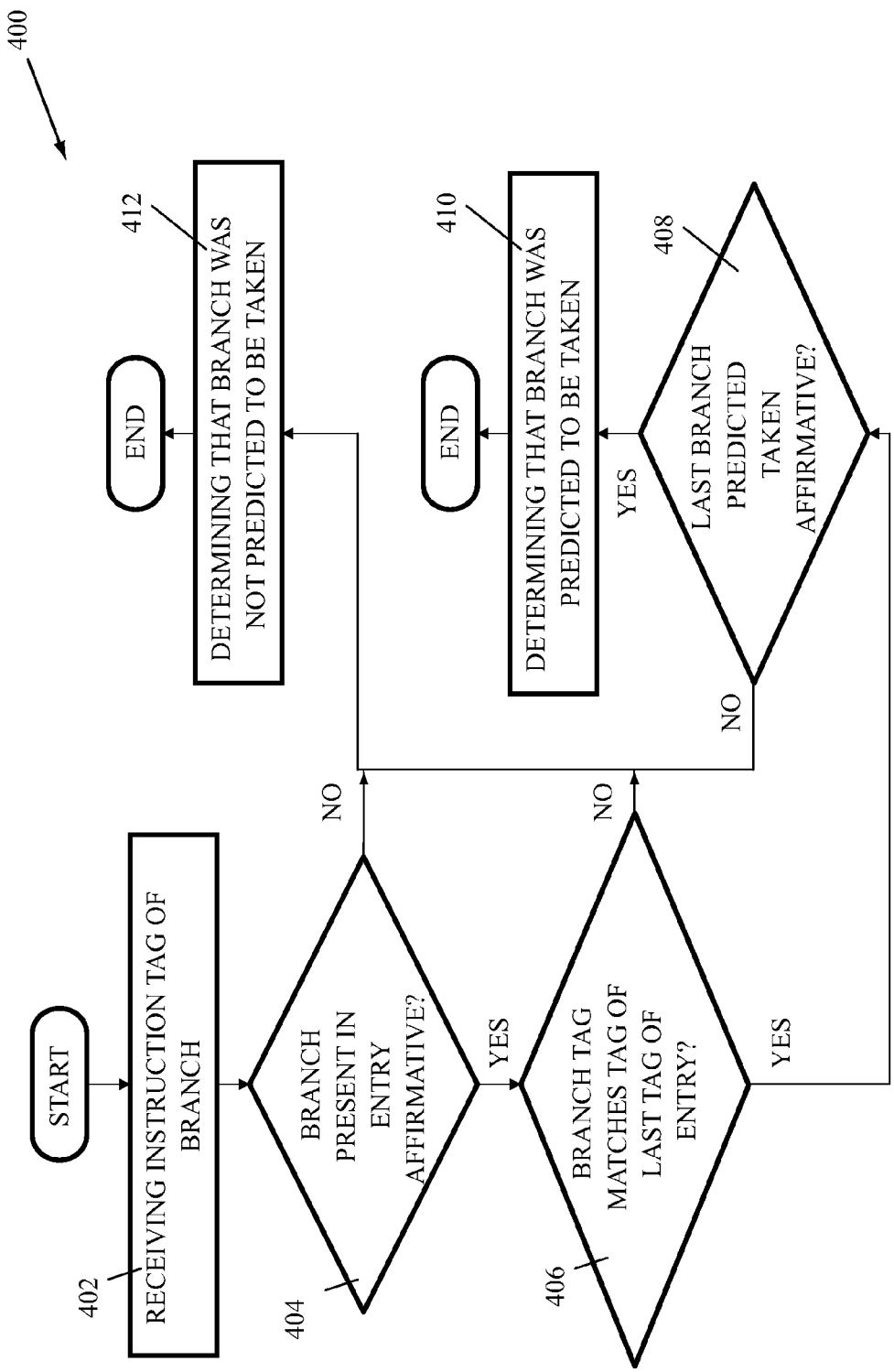
FIG. 4 depicts an example of a flow chart for extracting branch information from an address table of a processor according to one embodiment.

FIG. 4 depicts an example of a flow chart for extracting branch information from an address table 122 of a processor according to one embodiment. The elements of flow chart 400 may be performed, in one embodiment, by a branch execution unit 112 of a data processor 100 or any other component or combination of components. Flow chart 400 begins with element 402, receiving the instruction tag of a branch for which branch information may be desired. A branch execution unit 112 may, for example, desire branch information about a branch that was taken to determine if the branch was predicted to be taken in order to refine the dynamic branch prediction algorithms. Once the branch execution unit 112 has the branch instruction tag, it may look at the address table 122 entry associated with the instruction tag at decision block 404. Typically, the entry associated with an instruction is the entry with a base instruction tag that is closest to the instruction tag and yet no larger than the instruction tag. The address table 122 may be configured as the address table of FIG. 6 in one embodiment. If there is an indication in the address table 122 that a branch instruction is present in the entry, flow chart 400 continues to decision block 406. If there is no indication that a branch is present in the entry, flow chart 400 continues to element 412 where it determines that the branch instruction was not predicted to be taken, after which the flow chart terminates. In this case, the instruction that was sent to the branch execution unit 112 is not a branch. This may occur, for example, in a design where the branch execution unit 112 is part of a unit that also executes other instructions.

If there is an indication that a branch is present in the entry, flow chart 400 continues to decision block 406. At decision block 406, the branch execution unit 112 may determine whether the branch instruction tag matches the instruction tag of the last branch of the entry. If the branch instruction tag does not match the instruction tag of the last branch of the entry, flow chart 400 continues to element 412 where it determines that the branch was not predicted to be taken, after which the flow chart terminates. If the branch instruction tag does not match the tag of the last branch indicated in the address table 122, the branch cannot have been predicted to be taken since a prediction of a branch being taken results in the creation of a new entry (and closing of the current entry to new instructions). Since the tags do not match, it implies that there are more instructions associated with the entry and the branch cannot have been predicted taken.

After determining that the branch instruction tag is the last branch of the entry, flow chart 400 continues to decision block 408, where it determines whether the last branch predicted taken indicator is affirmative. If there is an indication that the last branch predicted in the entry was taken, flow chart 400 continues to element 410 where it is determined that the instruction branch received at element 402 was the branch predicted to be taken. After element 410, flow chart 400 terminates. If the last prediction taken indication is negative, flow chart 400 continues to element 412 where it determines that the branch was not predicted to be taken, after which the flow chart terminates. If the last branch predicted taken is negative, the branch cannot have been predicted to be taken since it was determined to be the last branch in the entry.

Figure 5:
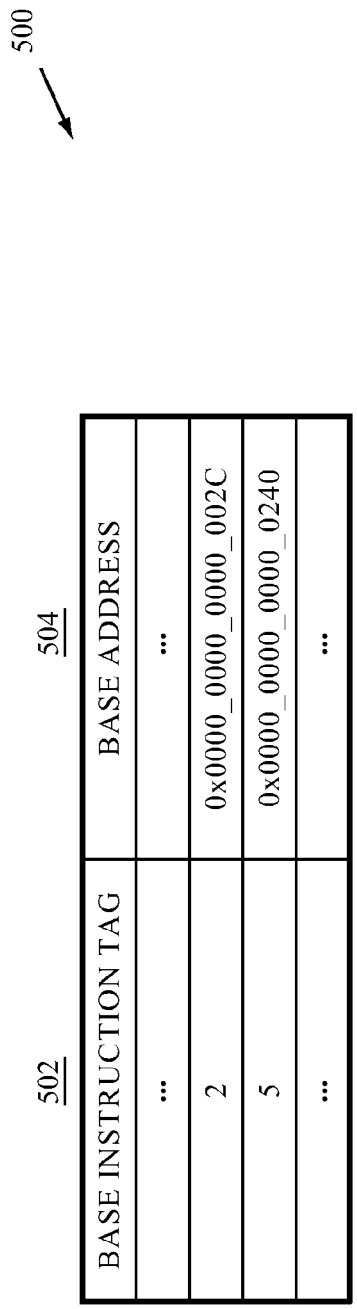
FIG. 5 depicts a table for storing instruction address information in an address table according to one embodiment.

FIG. 5 depicts a table for storing instruction address information in an address table according to one embodiment. Table 500 may be used in an address table 122 in embodiments similar to those described in relation to FIGS. 2 and 3. Table 500 may include a base instruction tag column 502 and a base address column 504 with each row representing an entry in the address table 122. In the example depicted in FIG. 5, base instruction tag '2' is associated with base address "0x0000_0000_0000_002C", and so on. In element 308 of FIG. 3, the predicted target address of a branch was determined from the address table 122. With table 500 representing the address table 122, the operation of element 308 of FIG. 3 may be illustrated. If a branch execution unit 112, for example, attempts to determine the predicted target address for an instruction with an instruction tag of '4', it may simply access the base address of the next entry (represented in table 500 by base instruction tag '5'). In this example, the predicted target address for instruction tag '4' would be the address of instruction tag '5' (the base address of the next entry), '0x0000_0000_0000_0240'. Moreover, the address associated with instruction tags '3' and '4' may be determined using the methodology described in relation to FIG. 3.

Figure 6:
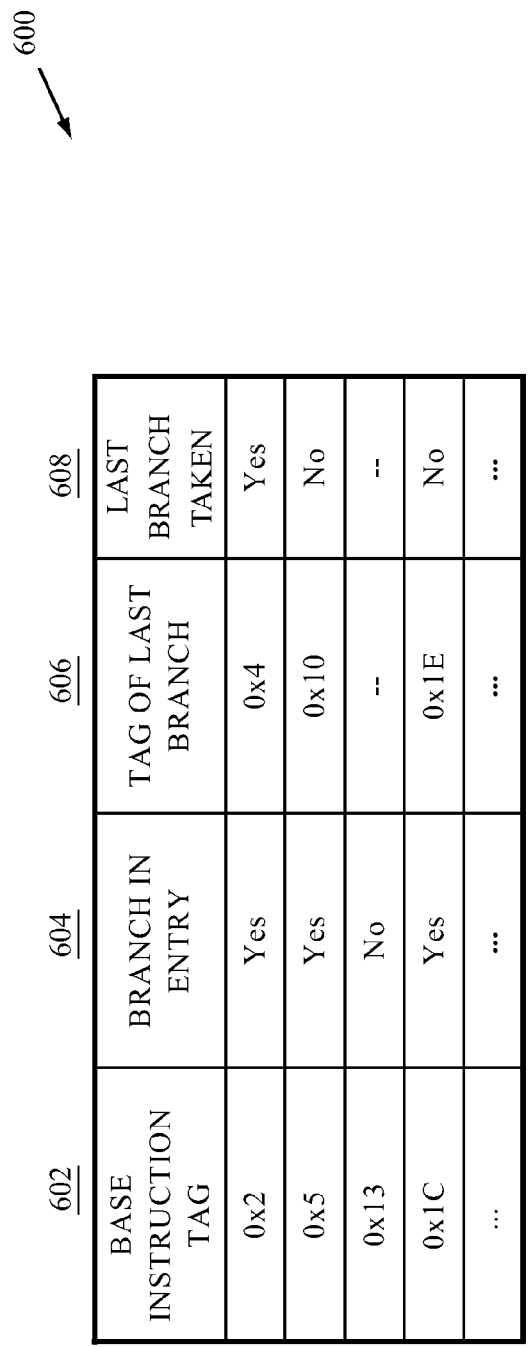
FIG. 6 depicts a table for storing branch information in an address table according to one embodiment.

FIG. 6 depicts a table for branch information in an address table according to one embodiment. Table 600 may be used, for example, in an address table 122 in embodiments similar to that of FIG. 4. Table 600 may be particularly useful when dynamic branch prediction is used in a data processor 100. Table 600 may include a base instruction tag column 602, which may be substantially similar to columns 502 of table 500 with each row representing an entry in the address table 122. Table 600 may also contain columns representing other branch information, such as a branch in entry column 604, a tag of last branch column 606, and a last branch taken column 608. The branch in entry column 604 provides an indication (which may be a one bit binary indication) of whether there is a branch in the entry. The tag of last branch column 606 provides the instruction tag of the last branch, if any, in the entry. If there is no branch in the entry a null value may be inserted in this column. The last branch taken column 608 provides an indication (which may be a one bit binary indication) of whether the last branch in the entry is predicted to be taken. If there is no branch in the entry a null value may be inserted in this column.

In one example, if instruction tag '0x4' was sent to the branch execution unit 112, the branch execution unit 112 may use table 600 stored in address table 122 to determine whether the instruction tag was predicted taken. The entry related to instruction tag '0x4' would be the entry with base instruction tag '0x2', as instruction tag '0x4' is in between base instruction tags '0x2' and '0x5', indicating that it is related to the first entry of that pair. Analyzing the entry, both the branch in entry column 604 and the last branch taken column 608 have affirmative indications and the instruction tag matches the tag of the last branch column 606 ('0x4'), so the branch execution unit may then determine that the instruction associated with instruction tag '0x4' was a branch instruction that was predicted taken.

Conversely, if the instruction tag '0x10' is sent to the branch execution unit 112, the branch execution unit 112 would determine that it relates to the entry starting with base instruction tag '0x5' and that the branch was not predicted taken, as the last branch taken indication 608 of its associated entry is negative. Similarly, the instruction tag '0x17' would be determined to have been predicted not taken as its branch in entry column 604 indicates negative. An entry with no branches, such as the entry with base instruction tag '0x13', may have null values in columns 606 and 608.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates a method and system for storing branch information in an address table of a processor. It is understood that the forms of the invention shown and described in the detailed description and the drawings are to be taken merely as examples. It is intended that the following claims be interpreted broadly to embrace all the variations of the example embodiments disclosed.

What is claimed is:

1. A method, in a processor of a data processing system, for performing branch operations, comprising:
fetching, by an instruction fetch unit of the processor, an instruction to be executed;
retrieving, from a single address table structure of the processor, instruction information for the fetched instruction; and
performing, by a branch execution unit of the processor, a branch operation based on the received instruction and the instruction information retrieved from the single address table structure of the processor, wherein:

the single address table structure comprises address table entries, each address table entry corresponding to one or more instructions to be executed by the processor and simultaneously storing both address information and branch prediction information for the one or more instructions, and the single address table structure is coupled to, and shared by, both the instruction fetch unit and the branch execution unit, and wherein performing the branch operation based on the received instruction and the instruction information retrieved from the single address table structure of the processor further comprises determining a predicted target address for a branch instruction of a first address table entry in the single address table structure based on a base address of a next address table entry in the single address table structure, in response to the first address table entry comprising branch information indicating the branch instruction to be predicted to be taken.

2. The method of claim 1, wherein at least one address table entry represents a plurality of instructions and the plurality of instructions comprises one or more branch instructions, and wherein the at least one address table entry comprises an indication of whether there is a branch present in plurality of instructions corresponding to the address table entry, an instruction tag of a last branch in the plurality of instructions represented by the address table entry, and an indication of whether the last branch in the plurality of instructions represented by the address table entry is predicted taken.

3. The method of claim 1, wherein at least one address table entry in the single address table structure represents a plurality of instructions, and wherein a same address table entry and base address specified in the same address table entry in the single address table structure is used to process the plurality of instructions.

4. A method, in a processor of a data processing system, for performing branch operations, comprising:

fetching, by an instruction fetch unit of the processor, an instruction to be executed;

retrieving, from a single address table structure of the processor, instruction information for the fetched instruction; and performing, by a branch execution unit of the processor, a branch operation based on the received instruction and the instruction information retrieved from the single address table structure of the processor; and invalidating an address table entry in the single address table structure in response to execution of all instructions corresponding to the address table entry being completed, wherein:

the single address table structure comprises address table entries, each address table entry corresponding to one or more instructions to be executed by the processor and simultaneously storing both address information and branch prediction information for the one or more instructions, and the single address table structure is coupled to, and shared by, both the instruction fetch unit and the branch execution unit.

5. The method of claim 1, wherein retrieving, from the single address table structure of the processor, instruction information for the fetched instruction comprises:

extracting a base instruction tag and base address from the single address table structure based on an instruction tag of the fetched instruction; and calculating an instruction address for the fetched instruction based on the base instruction tag and base address.

6. The method of claim 5, wherein calculating the instruction address for the fetched instruction based on the base instruction tag and base address comprises calculating the instruction address using the following relationship:

$$\text{instruction address} = \text{base address} + (\text{instruction tag of the fetched instruction} - \text{base instruction tag}) * \text{fixed instruction length}.$$

7. The method of claim 1, wherein performing the branch operation comprises determining a predicted target address of a branch instruction corresponding to the address table entry by extracting a base address for an address table entry corresponding to an instruction that is subsequent to an address table entry corresponding to the branch instruction.

8. The method of claim 1, wherein performing the branch operation comprises:

receiving an instruction tag of the fetched instruction;

retrieving an address table entry corresponding to the fetched instruction based on the instruction tag;

determining if the address table entry indicates a branch instruction to be present in a group of instructions represented by the address table entry;

determining if the instruction tag of the fetched instruction matches an instruction tag of a last branch specified in the address table entry;

determining that the last branch was predicted taken if the instruction tag of the fetched instruction matches the instruction tag of the last branch specified in the address table entry; and executing the branch operation in response to the determination that the last branch was predicted taken.

9. The method of claim 8, wherein retrieving the address table entry corresponding to the fetched instruction based on the instruction tag comprises identifying an address table entry having a corresponding base instruction tag that is closest to the instruction tag of the fetched instruction but no larger than the instruction tag.

10. An apparatus, comprising:

an instruction fetch unit that is configured to fetch an instruction to be executed;

a single address table structure coupled to the fetch unit; and a branch execution unit coupled to the single address table structure, wherein the branch execution unit is configured to:

retrieve, from the single address table structure, instruction information for the fetched instruction; and perform a branch operation based on the received instruction and the instruction information retrieved from the single address table structure of the processor, wherein:

the single address table structure comprises address table entries, each address table entry corresponding to one or more instructions to be executed by the processor and simultaneously storing both address information and branch prediction information for the one or more instructions, and the single address table structure is coupled to, and shared by, both the instruction fetch unit and the branch execution unit, and wherein the branch execution unit performs the branch operation based on the received instruction and the instruction information retrieved from the single address table structure of the processor by determining a predicted target address for a branch instruction of a first address table entry in the single address table structure based on a base address of a next address table entry in the single address table structure, in response to the first address table entry comprising branch information indicating the branch instruction to be predicted to be taken.

11. The apparatus of claim 10, wherein at least one address table entry represents a plurality of instructions and the plurality of instructions comprises one or more branch instructions, and wherein the at least one address table entry comprises an indication of whether there is a branch present in plurality of instructions corresponding to the address table entry, an instruction tag of a last branch in the plurality of instructions represented by the address table entry, and an indication of whether the last branch in the plurality of instructions represented by the address table entry is predicted taken.

12. The apparatus of claim 10, wherein at least one address table entry in the single address table structure represents a plurality of instructions, and wherein a same address table entry and base address specified in the same address table entry in the single address table structure is used to process the plurality of instructions.

13. An apparatus, comprising:
an instruction fetch unit that is configured to fetch an instruction to be executed;
a single address table structure coupled to the fetch unit; and
a branch execution unit coupled to the single address table structure, wherein the branch execution unit is configured to:
retrieve, from the single address table structure, instruction information for the fetched instruction; and
perform a branch operation based on the received instruction and the instruction information retrieved from the single address table structure of the processor, wherein:
the single address table structure comprises address table entries, each address table entry corresponding to one or more instructions to be executed by the processor and simultaneously storing both address information and branch prediction information for the one or more instructions,
the single address table structure is coupled to, and shared by, both the instruction fetch unit and the branch execution unit, and wherein both the instruction fetch unit and branch execution unit directly access the single address table structure, and
the apparatus is configured to invalidate an address table entry in the single address table structure in response to execution of all instructions corresponding to the address table entry being completed.

14. The apparatus of claim 10, wherein the branch execution unit is configured to retrieve, from the single address table structure of the processor, instruction information for the fetched instruction by:
extracting a base instruction tag and base address from the single address table structure based on an instruction tag of the fetched instruction; and
calculating an instruction address for the fetched instruction based on the base instruction tag and base address.

15. The apparatus of claim 14, wherein calculating the instruction address for the fetched instruction based on the base instruction tag and base address comprises calculating the instruction address using the following relationship:

instruction address=base address+(instruction tag of the fetched instruction−base instruction tag)
*fixed instruction length.

16. The apparatus of claim 10, wherein the branch execution unit is configured to perform the branch operation by determining a predicted target address of a branch instruction corresponding to the address table entry by extracting a base address for an address table entry corresponding to an instruction that is subsequent to an address table entry corresponding to the branch instruction.

17. The apparatus of claim 10, wherein the branch execution unit is configured to perform the branch operation by:
receiving an instruction tag of the fetched instruction;
retrieving an address table entry corresponding to the fetched instruction based on the instruction tag;
determining if the address table entry indicates a branch instruction to be present in a group of instructions represented by the address table entry;
determining if the instruction tag of the fetched instruction matches an instruction tag of a last branch specified in the address table entry;
determining that the last branch was predicted taken if the instruction tag of the fetched instruction matches the instruction tag of the last branch specified in the address table entry; and
executing the branch operation in response to the determination that the last branch was predicted taken.

18. The apparatus of claim 17, wherein the branch execution unit is configured to retrieve the address table entry corresponding to the fetched instruction based on the instruction tag by identifying an address table entry having a corresponding base instruction tag that is closest to the instruction tag of the fetched instruction but no larger than the instruction tag.

19. A computer program product for performing branch operations, the computer program product comprising:
a non-transitory computer readable storage medium;
first program instructions to fetch an instruction to be executed;
second program instructions to retrieve, from a single address table structure, instruction information for the fetched instruction; and
third program instructions to perform a branch operation based on the received instruction and the instruction information retrieved from the single address table structure of the processor, wherein the first, second, and third program instructions are stored on the computer readable storage medium, and wherein:
the single address table structure comprises address table entries, each address table entry corresponding to one or more instructions to be executed by the processor and simultaneously storing both address information and branch prediction information for the one or more instructions, and
the single address table structure is coupled to, and shared by, both the instruction fetch unit and the branch execution unit, and wherein performing the branch operation based on the received instruction and the instruction information retrieved from the single address table structure of the processor further comprises determining a predicted target address for a branch instruction of a first address table entry in the single address table structure based on a base address of a next address table entry in the single address table structure, in response to the first address table entry comprising branch information indicating the branch instruction to be predicted to be taken.

* * * * *